United States Patent [19]

Brande

[11] Patent Number: 4,795,172
[45] Date of Patent: Jan. 3, 1989

[54] GREASE SEAL FOR A POWER SCREW SYSTEM

[75] Inventor: David Brande, Cincinnati, Ohio

[73] Assignee: Cincinnati Milacron Inc., Cincinnati, Ohio

[21] Appl. No.: 129,492

[22] Filed: Dec. 7, 1987

[51] Int. Cl.⁴ .................. F16J 15/16; F16H 55/22
[52] U.S. Cl. ........................ 277/165; 277/167; 277/203; 74/424.8 R
[58] Field of Search ............. 277/163, 165, 167, 203, 277/204, 24; 74/424.8 R

[56] References Cited

U.S. PATENT DOCUMENTS

| | | | |
|---|---|---|---|
| 3,258,983 | 7/1966 | Valenti | 74/424.8 R X |
| 3,851,541 | 12/1974 | Ploss et al. | 74/459 |
| 4,211,125 | 7/1980 | Benton | 74/424.8 R |
| 4,286,793 | 9/1981 | Ploss et al. | 277/165 |
| 4,557,156 | 12/1985 | Teramachi | 74/424.8 R X |
| 4,604,911 | 8/1986 | Teramachi | 74/424.8 R |
| 4,612,817 | 9/1986 | Neff | 74/424.8 R |
| 4,677,869 | 7/1987 | Mayfield | 74/424.8 R |

FOREIGN PATENT DOCUMENTS

| | | | |
|---|---|---|---|
| 0071332 | 2/1983 | European Pat. Off. | 74/424.8 R |
| 2928717 | 1/1981 | Fed. Rep. of Germany | 74/424.8 R |
| 215135 | 10/1984 | German Democratic Rep. | 74/424.8 R |

OTHER PUBLICATIONS

Design Engineering Guide No. 1 Available from American Felt & Filter Co., Fiberstruct Engineering Group, 18, p. 1987.

Primary Examiner—Robert S. Ward
Attorney, Agent, or Firm—Frank C. Leach; Thomas M. Farrell

[57] ABSTRACT

A distortable diaphragm seal, which is preferably formed of felt, seals each end of a nut through which a screw extends. Grease, which is introduced into the interior of the nut to function as a lubricant, is sealed therein by the seal. The seal has an opening of substantially the cross sectional shape of the screw normal to the axial centerline of the screw to permit part of the seal to extend circumferentially along the unthreaded O.D., and to permit another portion of the diaphragm seal to run into, and out of, a helical groove in the ball screw, thus forming a continuous seal on the screw surface.

20 Claims, 4 Drawing Sheets

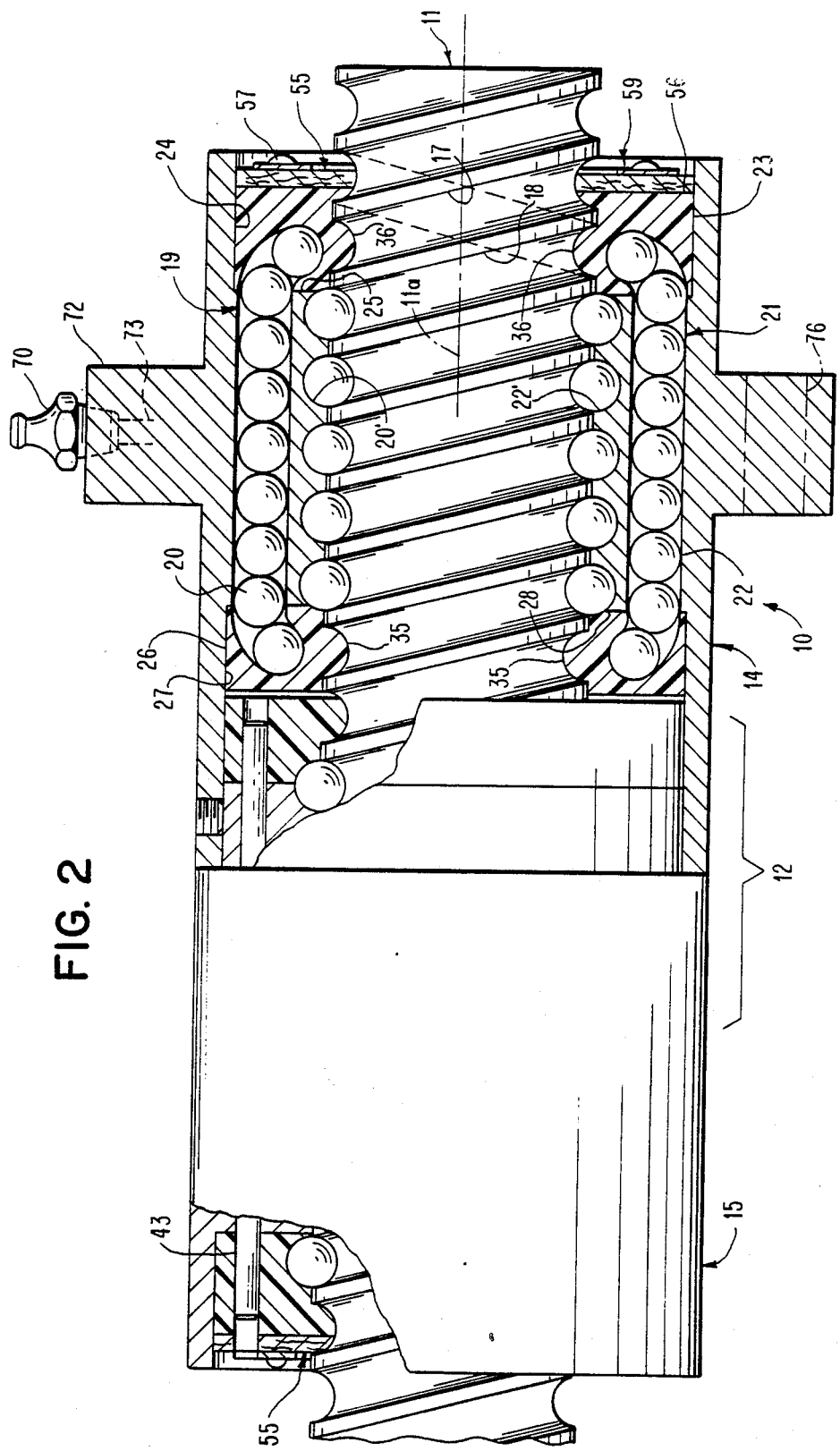

GREASE SEAL FOR A POWER SCREW SYSTEM

This invention relates to a seal for a ball screw nut and, more particularly, to a seal for retaining grease lubricant within a ball screw nut.

It is necessary to provide a lubricant between the balls and helical grooves of the nut and screw in a ball screw system to not only reduce friction but also increase the life of the parts.

In some prior power screw systems, a central lubricating system is employed in which the ends of the ball nut are open and oil flows through the ball nut to lubricate the helical grooves in the ball screw and the cooperating helical grooves in the ball nut along with the balls. However, this is limited to situations in which the presence of oil is not a problem. This also requires a single oil for both the balls and the ways. Since each actually needs a different grade of lubricant, it is preferred to have two separate lubricants but such is not very feasible when using oil.

When using a power ball screw system with a robot, for example, this oil flowing arrangement for lubricating the balls and the grooves of the nut and screw, along with the ways, often cannot be employed for a variety of reasons, including the fact that electric robots do not have pump-and-tank units. Thus, it has previously been suggested to seal each of the end faces of a ball nut through a tight-fitting lip seal to retain lubricant. However, a lip seal increases the load on the ball screw so that a large motor is required than would be needed if no seal is utilized. This is undesirable in robotic systems, because of increased costs, and problems with space and mobility.

Since a screw is grooved, it should be understood that the cross section of the ball screw at a plane normal to its axial centerline is non-circular, and thus the seal, which is affixed to the nut perpendicular to the axial centerline of the ball screw, must always be capable of sealing the ball screw cross-sectional form irrespective of the relative positions of the screw and nut.

In many prior art systems, the aforesaid lip seal, which is usually elastomeric, is fixed to the ball nut and seals around the ball screw by having a tight fit therewith so that there is a relatively large friction between the lip seal and the ball screw. This increases the temperature so as to affect the effectiveness of the lip seal. This tight fit creates a substantial load on the driver motor. Further, a lip seal is not satisfactory when operating at high temperatures with grease. The lip seal has a knife edge for sealing which produces a very thin area of contact with the helical groove in the ball screw, subject to high wear, so as to not effectively prevent the escape of grease.

Another type of seal is found in U.S. Pat. No. 4,604,911 to Teramachi. The seal in the aforesaid Teramachi patent is molded from a rigid plastic or hard rubber and has a bore with an integral ridge molded therein to mate with the helical groove in the ball screw. Surface-to-surface contact provides a substantial load and relatively large temperatures. When molded with a slight clearance between the molded seal and the ball screw, grease or oil will escape. Further, mold costs can be substantial. Thus, this is not a satisfactory seal.

U.S. Pat. No. 4,211,125 to Benton discloses a seal around the exterior of the ball screw. This would not prevent the escape of grease within the helical groove in the ball screw.

Other types of seals for ball screws are shown in U.S. Pat. No. 4,612,817 to Neff and U.S. Pat. No. 3,851,541 to Ploss et al. These do not satisfactorily prevent the escape of grease.

The seal of the present invention satisfactorily overcomes the problems in the previously suggested seals in that it can seal grease up to a temperature of 250° F. Thus, a relatively high operating temperature does not affect the effectiveness of the seal of the present invention.

The seal of the present invention produces lower operating temperatures at higher speeds than is available when using a lip seal, for example. This is obtained through not only having a reduced load on the ball screw from the seal but also because of being able to use grease as the lubricant and retain the grease within the ball nut at relatively high temperature.

The seal of the present invention is formed with an opening of substantially the same shape as the cross-sectional shape of the ball screw normal to the axial centerline of the ball screw. Thus, as the ball screw rotates relative to the seal, which is clamped to the ball nut, the edge of the opening rides along the helical groove in a relatively large area thereof.

By forming the opening in the seal of a size slightly smaller than the cross section of the ball screw except at the crossover, which is the smooth peripheral land portion of the ball screw O.D., the seal hugs the screw groove exiting the nut and, through a wiping action, prevents the exiting groove from retaining grease during relative axial movement between the ball nut and the ball screw. It is immaterial as to whether the ball screw or the ball nut is moving axially.

By so shaping the seal opening, there is only a significant preload in the portion of the seal in the helical groove. There is only a minimum preload at the crossover because the opening in the seal at the portion having the crossover is substantially the same size as the crossover of the cross section of the ball screw normal to the axial centerline of the ball screw.

An object of this invention is to provide a grease seal for use with a power screw system including a screw extending through a nut to retain grease within the nut.

Another object of this invention is to provide a grease seal for a power screw system including a screw and a nut without substantially increasing the horsepower requirements of the prime mover.

Other objects of this invention will be easily perceived from the following description, claims, and drawings.

The attached drawings illustrate preferred embodiments of the invention, in which:

FIG. 2 is a longitudinal sectional view of the power screw system of FIG. 1 and taken along line 2—2 of FIG. 1 with one portion of the ball nut rotated relative to line 2—2 of FIG. 1 to show retaining pins for use with a wiper and a seal of the present invention;

Figure 1:
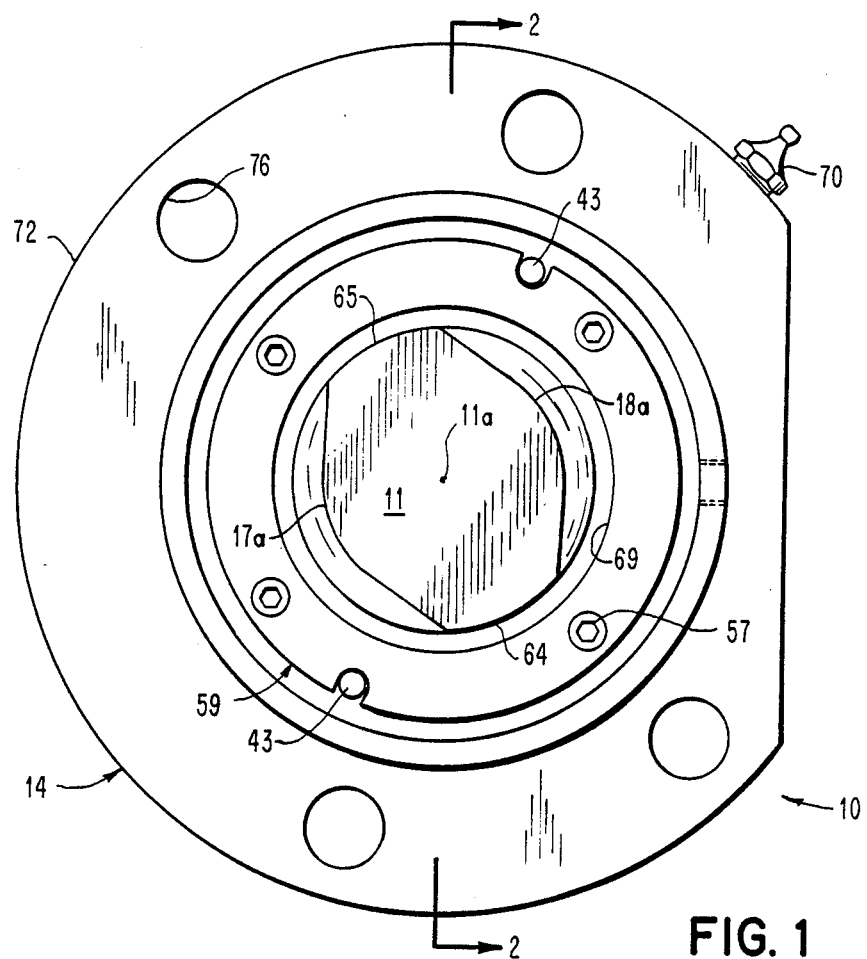
FIG. 1 is an end elevational view of a double start ball screw and a ball nut of a power screw system having a seal of the present invention at each end of the ball nut where the ball screw extends through the ball nut.

Referring to the drawings and particularly FIG. 2, there is shown a power screw system 10 including a ball screw 11 extending through a ball nut 12. One of the ball screw 11 and the ball nut 12 is fixed while the other can move axially along the axial centerline 11a of the ball screw 11.

The ball screw 11 is driven by suitable motive means (not shown) in the well-known manner so that the ball screw 11 is rotated. With the ball screw 11 fixed against axial advancement, rotation of the ball screw 11 relative to the ball nut 12 advances the ball nut 12 axially along the axial centerline 11a of the ball screw 11.

The ball nut 12 is preloaded, i.e. formed of a flanged nut 14 and a trailing nut 15 counter-torqued and locked to one another in a manner such as shown and described in U.S. Pat. No. 4,677,869 of R. W. Mayfield for "Linear Actuator", and assigned to the same assignee as the assignee of this application. The aforesaid Mayfield patent is incorporated by reference herein.

The ball screw 11 is a double start ball screw so that it has two separate helical grooves or tracks 17 and 18 formed therein, beginning at diametrically-opposed points. The flanged ball nut 14 has a first endless ball circuit 19 including balls 20 for use with the helical groove 17 in the ball screw 11 and a corresponding helical groove 20' in the flanged ball nut 14 and a second endless ball circuit 21 including balls 22 for use with the helical groove 18 in the ball screw 11 and a corresponding helical groove 22' in the flanged ball nut 14. The endless ball circuits 19 and 21 are formed in a manner similar to that shown and described in the aforesaid Mayfield patent.

The flanged ball nut 14 includes an outer end closure 23 seated within a first clearance counterbore 24 against an outer end face 25. An inner end closure 26 is seated within a second clearance counterbore 27 against an inner end face 28.

The ball circuits 19,21 recirculate through the flanged nut 14 and the nut end closures 23,26 in a known manner.

The end closures 26 and 23 have wiper portions 35 and 36 respectively of a thread-like form for disposition within the helical grooves 17 and 18 in the ball screw 11 to wipe the helical grooves 17 and 18 of debris. When the inner end closure 26 and the outer end closure 23 are formed from a non-metallic material, small particles may also embed themselves within the wiper portions 35 and 36, preventing entry of contaminants to the interior of the nut 12.

Additionally, the wiper portions 35 and 36 of the inner and outer end closures 26 and 23 respectively ride in the helical grooves 17 and 18 in the ball screw 11 to prevent any axial motion between the flanged ball nut 14 and the end closures 26,23 and to assist in retaining grease within the flanged ball nut 14.

The trailing ball nut 15 is of similar construction to the flanged ball nut 14.

A grease fitting 70 (shown out of position in FIG. 2) is provided in a nut flange 72 and is connected with suitable interdrilling 73 to provide grease sufficient to lubricate the interior of each of the nuts 14 and 15. It will be appreciated that power lubricators may be employed, as well as simple hand-packing techniques.

The flanged ball nut 14 has a distortable diaphragm seal 55 attached to an outer end face 56 of the outer end closure 23 by screws 57 extending through holes 58 (see FIG. 5) in a metallic retaining ring 59 and holes 60 (see FIG. 4) in the seal 55. The seal 55 is substantially perpendicular to the axial centerline 11a (see FIG. 2) of the ball screw 11 when the seal 55 is not distorted.

The seal 55 (see FIG. 4) has a pair of diametrically disposed clearance holes 61 to receive locking pins 43 (see FIG. 1) which prevent relative rotation of the outer end closure 23 (see FIG. 2) and the flanged ball nut 14. The other end closures of the ball nut 12 are likewise pinned. The retaining ring 59 (see FIG. 5) has a pair of diametrically disposed clearance slots 62 in its circumference for the locking pins 43 (see FIG. 1).

The seal 55 (see FIG. 4) is preferably formed of a white felt of a grade F-1. The seal 55 preferably has a thickness of ⅛". Thus, the seal 55 is thick enough to be disposed within the adjacent helical grooves 17 (see FIG. 2) and 18 in the ball screw 11. With the seal 55 having a thickness of ⅛", the retaining ring 57 has a thickness of 0.048", for example.

The seal 55 (see FIG. 4) has an opening 63 of substantially the same shape as the cross section of the ball screw 11 (see FIG. 1) normal to its axial centerline 11a (see FIG. 2). With the ball screw 11 being a double start ball screw so that it has two separate helical grooves 17 and 18, the cross section of the ball screw 11 normal to its axial centerline 11a has two crossovers 64 (see FIG. 1) and 65 diametrically opposite each other. The crossovers 64 and 65 are the smooth peripheral land portions of the ball screw O.D., i.e., having no threads, so that they constitute the outer diameter of the ball screw 11 in any cross section normal to its axial centerline 11a (see FIG. 2). Each of the crossovers 64 (see FIG. 1) and 65 is thus an arc of a circle having its center at the axial centerline 11a (see FIG. 2) of the ball screw 11.

Here it should be noted that the end view, FIG. 1, depicts the shape of and orientation of the cross-sectional plane at the end of the ball screw 11 of FIG. 2. Successive planar cuts taken axially along the ball screw 11 from end will have the same shape, but the orientation will rotate through 360° along the lead of the ball screw 11. The lead being an axial dimension from a point on a thread to the corresponding point on the same thread as it advances down the ball screw 11.

With the foregoing explanation in mind, it will become apparent that the opening 63 (see FIG. 4) in the seal 55 is oriented to the hole pattern per its axial location on the ball screw 11 in FIG. 2.

Figure 4:
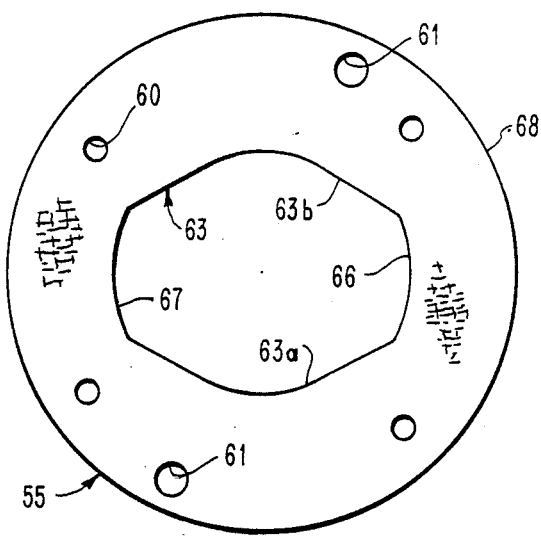
FIG. 4 is an end elevational view of a seal of the present invention used with the double start ball screw of FIG. 1.

As shown in FIG. 4, the opening 63 has substantially the same shape and size as the cross section of the ball screw 11 (see FIG. 1) normal to its axial centerline 11a. Thus, the opening 63 (see FIG. 4) in the seal 55 has a pair of diametrically disposed crossovers 66 and 67 formed with each having the same radius as the screw crossovers 64 (see FIG. 1) and 65. The seal 55 (see FIG. 4) has the opening 63 slightly smaller along its portions 63a,b extending between the crossovers 66 and 67 than the corresponding track portions 17a,18a of the ball screw 11 (see FIG. 1) to preload the seal against the ball tracks 17 (see FIG. 2) and 18 and to compensate for out-of-plane distortion caused by the seal thickness.

The seal 55 (see FIG. 4) has its circumference 68 slightly larger than the counterbore 24 (see FIG. 2) in the flanged ball nut 14. Thus, there is a preloading of the seal 55 against the counterbore 24 in the flanged ball nut 14.

Figure 5:
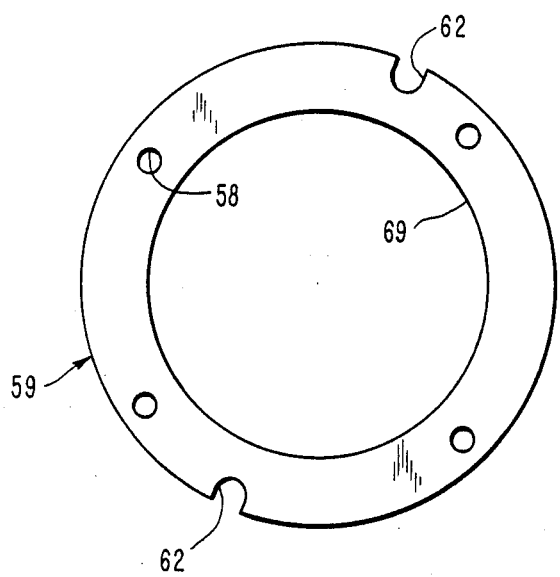
FIG. 5 is an end elevational view of a retaining ring for holding the seal of FIG. 4 in position on the ball nut of FIG. 1.

There is a slight preloading at each of the crossovers 66 and 67 of the opening 63 because of the interference fit on the circumference 68 of the seal 55 and from bulging due to compression of the seal 55 under the retaining ring 59 (see FIG. 5). However, this is a minimum preloading in comparison with that applied to the portion 63a (see FIG. 4) and 63b of the opening 63 spanning the ball tracks 17 (see FIG. 2) and 18, respectively.

The retaining ring 59 (see FIG. 5) has a circular opening 69, which has its edge control where the seal 55 (see FIG. 2) runs across the helical grooves 17 and 18 in the ball screw 11. Varying the distance from the edge of the ring opening 69 (see FIG. 5) to the seal opening 63 (see FIG. 4) affects the preload of the seal 55 on the ball tracks 17 (see FIG. 2) and 18.

Figure 3:
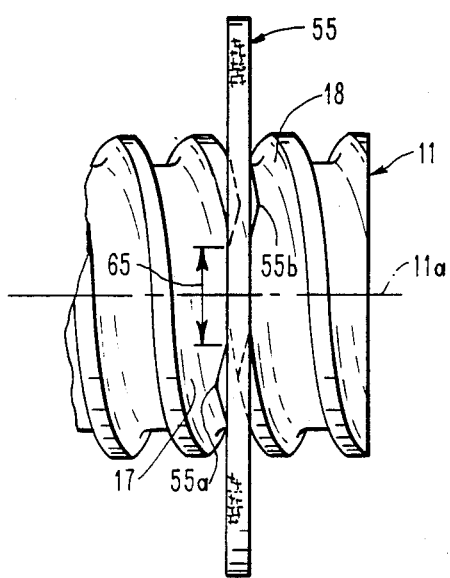
FIG. 3 is a fragmentary longitudinal view of only the power screw and seal of FIG. 2.

FIG. 3 is a view taken along the longitudinal axis 11a of the screw 11, showing the seal 55 in position. While the seal 55 is generally planar, it is forced to conform to the ball tracks 17,18 by out-of-plane, axial distortion at several points 55a,b. This distortion or flexion is due to the thickness of the felt seal 55 and would not be present if the seal 55 were simply a dimensionless plane. The distortion points 55a,b occur where the seal 55 enters and leaves contact with the ball tracks 17,18 and, of course, are present at corresponding diametrically-opposite points (not shown) on the screw 11. At the screw crossovers 65 and 64 (see FIG. 1), the seal 55 (see FIG. 4) is axially unstressed.

The trailing nut 15 (see FIG. 2) also has a seal 55 attached to the outer end closure 46 by the screws 57. Each of the seals 55 functions in the same manner.

Each of the seals 55 prevents any grease, which is introduced into the interior of the flanged ball nut 14 and the trailing ball nut 15, from escaping along the helical grooves 17 and 18 because of continuous wiping and sealing action.

The flange 72 of the flanged ball nut 14 has a plurality of axial passages 76 (see FIG. 1) extending therethrough to enable mounting of the flanged ball nut 14 on a desired structure such as a robot, for example. Thus, the portion of the robot connected to the flanged ball nut 14 advances linearly with the flanged ball nut 14 along the axial centerline 11a (see FIG. 2) of the ball screw 11 during relative rotation between the ball screw 11 and the ball nut 12.

Figure 8:
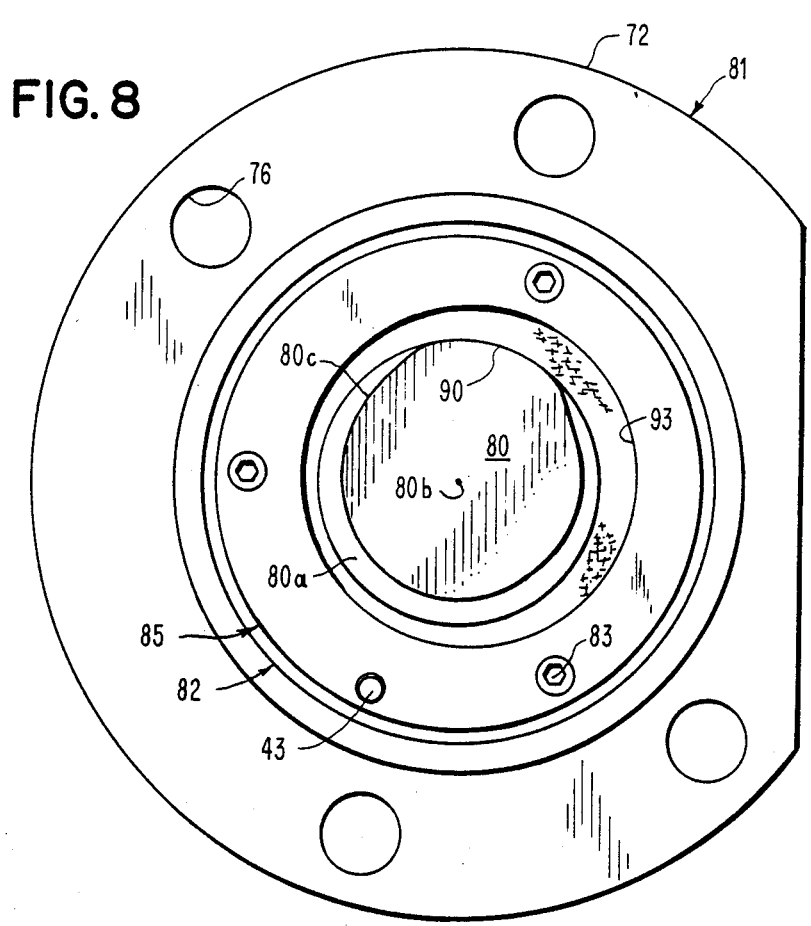
FIG. 8 is an end elevational view of a single start ball screw and a ball nut of a power screw system having the seal of FIG. 6 and the retaining ring of FIG. 7 at each end of the ball nut where the ball screw extends through the ball nut.

While the ball screw 11 has been shown as a double start ball screw, it should be understood that such is not a requisite for satisfactory operation. For example, as shown in FIG. 8, a single start ball screw 80 may be utilized with a companion ball nut 81, with a seal 82 of the present invention at each end face of the ball nut 81. The seal 82 would be formed of the same material as the seal 55 of FIG. 4.

Figure 6:
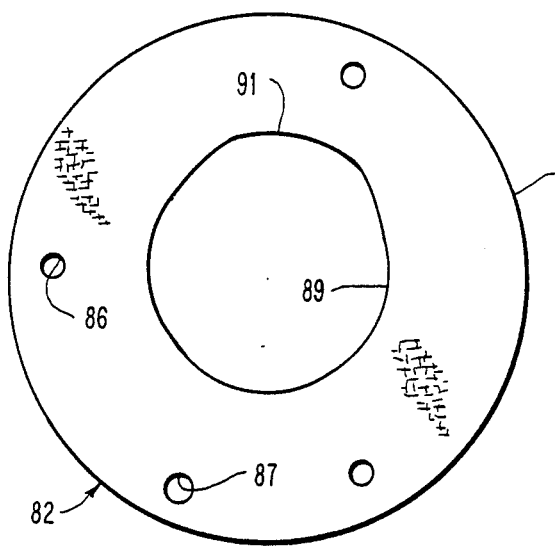
FIG. 6 is an end elevational view of a modification of the seal of the present invention for use with a single start ball screw.
Figure 7:
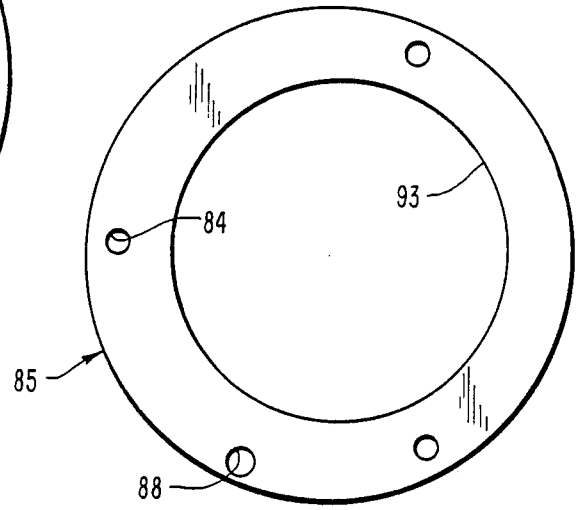
FIG. 7 is an end elevational view of a retaining ring for holding the seal of FIG. 6 in position on a ball nut of FIG. 8.

The seal 82 (see FIG. 6) is attached to the ball nut 81 (see FIG. 8) by screws 83 extending through holes 84 and 86 in a metallic retaining ring 85 and in the seal 82, respectively, see FIGS. 6 and 7. The seal 82 has a clearance hole 87 for a locking pin 43 (see FIG. 8). The retaining ring 85 (see FIG. 7) has a clearance hole 88 for the locking pin 43 (see FIG. 8).

The seal 82 (see FIG. 6) is preferably formed of the same material and thickness as the seal 55 (see FIG. 4), and the retaining ring 85 of FIG. 7 is preferably the same thickness as the retaining ring 59 of FIG. 5. The seal 82 (see FIG. 6) has an opening 89 of substantially the same shape as the cross section of the ball screw 80 (see FIG. 8) normal to its axial centerline 80b.

With the ball screw 80 being a single start ball screw so that it has a single helical groove or track 80a similar to the helical grooves 17,18 of FIG. 2, the cross section of the ball screw 80 (see FIG. 8) normal to its axial centerline 80b has only one crossover 90. The crossover 90 is the smooth peripheral land portion of the ball screw O.D., i.e., having no thread, so that it actually constitutes the outer diameter of the ball screw 80 in any cross section normal to its axial centerline 80b. The crossover 90 is thus an arc of a circle having its center at the axial centerline 80b of the ball screw 80.

As shown in FIG. 6, the opening 89 has substantially the same shape and size as the cross section of the ball screw 80 (see FIG. 8) normal to its axial centerline 80b. Thus, the opening 89 (see FIG. 6) in the seal 82 has a crossover 91 formed with the same radius as the screw crossover 90 (see FIG. 8). Except at the crossover 91 (see FIG. 6), the opening 89 in the seal 82 is slightly smaller than a corresponding track edge 80c of the ball screw 80 (see FIG. 8) to preload the seal 82 against the ball track 80a and to compensate for out-of-plane distortion caused by the seal thickness (see FIG. 3).

The seal 82 (see FIG. 6) has it circumference 92 slightly larger than the counterbore in the ball nut 81 (see FIG. 8) within which it is disposed. Thus, there is a preloading of the seal 82 (see FIG. 6) against the counterbore in the ball nut 81 (see FIG. 8) in the same manner as described for preloading of the seal 55 of FIG. 2 when it is disposed within the counterbore 24 in the flanged ball nut 14, for example.

As stated above, due to sizing, the seal 82 (see FIG. 6) also is preloaded at the opening 89 except at the crossover 91. There is a slight preloading at the crossover 91 of the opening 89 because of the interference fit on the circumference 92 of the seal 82 and because of bulging due to compression of the seal 82 under the retaining ring 85 (see FIG. 7). However, this is a minimum preloading in comparison with that applied to the portion of the opening 89 (see FIG. 6) spanning the ball track portion 80c (see FIG. 8).

The retaining ring 85 (see FIG. 7) has an eccentric opening 93, which exerts control where the seal 82 (see FIG. 8) runs across the edge 80c of the helical groove 80a in the ball screw 80. This eccentricity of the ring opening 93 (see FIG. 7) affects the preload of the seal 82 (see FIG. 6) on the ball track 80a (see FIG. 8).

The ball screw 11 (see FIG. 2) also could be more than a double start ball screw if desired. This would require corresponding changes in the shape of the opening 63 (see FIG. 4) in each of the seals 55 and the opening 69 (see FIG. 5) in each of the retaining rings 59.

Those skilled in the art will also appreciate that the invention may be applicable to screw systems other than ball screw assemblies.

An advantage of this invention is that it tends to prevent leakage of grease from a ball nut during relative movement between a ball screw and a ball nut. Another advantage of this invention is that a lower operating temperature is obtained at a higher speed by the use of grease other than oil as the lubricant between the ball screw and the ball nut. A further advantage of this invention is that it is necessary to replenish the grease at less intervals. Still another advantage of this invention is that it is relatively inexpensive in comparison with the previously available seals used with ball screws and ball nuts.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

I claim:

1. A grease seal for use in a power screw system including a screw having a substantially constant outer diameter about its axial centerline and at least one smooth helical groove formed in said outer diameter with a lead along said axial centerline; a nut cooperating with said screw to provide axial advancement of one of said screw and said nut with respect to the other during relative rotation between said screw and said nut, said nut having an end face substantially normal to said axial centerline; the improvement comprising:

means for introducing grease interiorly to said nut;
   a distortable diaphragm seal assuming the shape of a flat sheet in an unstressed state;
   said diaphragm seal having an opening approximating the cross-sectional shape of said screw normal to said axial centerline but smaller than the cross-sectional shape except where the cross-sectional shape of said screw is an arc of a circle with its center at said axial centerline to define a crossover to permit a portion of said diaphragm seal to extend into said helical groove in said screw;
   and means for claming said diaphragm seal to said end face of said nut whereby said diaphragm seal is clamped to said nut in assembly with said screw, said diaphragm seal being distorted along said axial centerline during relative rotation between said screw and said nut to smoothly conform in a stressed state to said helical groove in said screw to seal said helical groove in said screw and prevent leakage of grease exteriorly of said nut.

2. The improvement of according to claim 1 in which said diaphragm seal is formed of felt having a hardness of F-1.

3. The improvement according to claim 2 in which said diaphragm seal is preloaded at least in its portions disposed within said helical groove in said screw.

4. The improvement according to claim 3 in which said clamping means includes means to control distortion of said diaphragm seal along said axial centerline during relative rotation between said screw and said nut.

5. The improvement according to claim 2 in which said diaphragm seal is preloaded around its entire periphery.

6. The improvement according to claim 5 in which said clamping means includes means to control distortion of said diaphragm seal along said axial centerline during relative rotation between said screw and said nut.

7. The improvement according to claim 1 in which said diaphragm seal is preloaded at least in its portions disposed within said helical groove in said screw.

8. The improvement according to claim 7 in which said clamping means includes means to control distortion of said diaphragm seal along said axial centerline during relative rotation between said screw and said nut.

9. The improvement according to claim 1 in which said diaphragm seal is preloaded around its entire periphery.

10. The improvement according to claim 9 in which said clamping means includes means to control distortion of said diaphragm seal along said axial centerline during relative rotation between said screw and said nut.

11. A grease seal for use in a power screw system including a ball screw having a substantially constant outer diameter about its axial centerline and at least one smooth helical groove formed in said outer diameter with a lead along said axial centerline; a ball nut having at least one helical groove; a plurality of balls interposed in said helical groove in said ball screw and said helical groove in said ball nut in an endless ball circuit for cooperating with said ball screw and said ball nut to provide axial advancement of one of said ball screw and said ball nut with respect to the other during relative rotation between said ball screw and said ball nut, and said ball nut having an end face substantially normal to said axial centerline; the improvement comprising:

means for introducing grease interiorly to said ball nut;
   a distortable diaphragm seal assuming the shape of a flat sheet in an unstressed state;
   said diaphragm seal having an opening approximating the cross-sectional shape of said ball screw normal to said axial centerline but smaller than the cross-sectional shape except where the cross-sectional shape of said ball screw is an arc of a circle with its center at said axial centerline to define a crossover to permit a portion of said diaphragm seal to extend into said helical groove in said ball screw;
   and means for clamping said diaphragm seal to said end face of said ball nut whereby said diaphragm seal is clamped to said ball nut in assembly with said ball screw, said diaphragm seal being distorted along said axial centerline during relative rotation between said ball screw and said ball nut to smoothly conform in a stressed state to said helical groove in said ball screw to seal said helical groove in said ball screw and prevent leakage of grease exteriorly of said ball nut.

12. The improvement according to claim 11 in which said diaphragm seal is formed of felt having a hardness of F-1.

13. The improvement according to claim 12 in which said diaphragm seal is preloaded at least in its portions disposed within said helical groove in said ball screw.

14. The improvement according to claim 13 in which said clamping means includes means to control distortion of said diaphragm seal along said axial centerline during relative rotation between said ball screw and said ball nut.

15. The improvement according to claim 12 in which said diaphragm seal is preloaded around its entire periphery.

16. The improvement according to claim 15 in which said clamping means includes means to control distortion of said diaphragm seal along said axial centerline during relative rotation between said ball screw and said ball nut.

17. The improvement according to claim 11 in which said diaphragm seal is preloaded at least in its portions disposed within said helical groove in said ball screw.

18. The improvement according to claim 17 in which said clamping means includes means to control distortion of said diaphragm seal along said axial centerline during relative rotation between said ball screw and said ball nut.

19. The improvement according to claim 11 in which said diaphragm seal is preloaded around its entire periphery.

20. The improvement according to claim 19 in which said clamping means includes means to control distortion of said diaphragm seal along said axial centerline during relative rotation between said ball screw and said ball nut.

* * * * *